(12) United States Patent
Shin et al.

(10) Patent No.: US 7,031,570 B2
(45) Date of Patent: Apr. 18, 2006

(54) DEVICE AND METHOD OF TEMPERATURE COMPENSATING OPTICAL COMPONENT

(75) Inventors: Chow-Shing Shin, Taipei (TW);
Chiu-Hao Lin, Tainan (TW);
Chia-Chin Chiang, Keelung (TW);
Shien-Kuei Liaw, Taoyuan (TW);
Yu-Chang Tseng, Hualien (TW);
Hsuan-Chen Chen, Sanchong (TW)

(73) Assignee: National Taiwan University of Science and Technology, Taipei (TW)

( * ) Notice: Subject to any disclaimer, the term of this patent is extended or adjusted under 35 U.S.C. 154(b) by 125 days.

(21) Appl. No.: 10/712,837

(22) Filed: Nov. 13, 2003

(65) Prior Publication Data

US 2004/0126062 A1   Jul. 1, 2004

(30) Foreign Application Priority Data

Dec. 30, 2002   (TW) .............................. 92104358 A

(51) Int. Cl.
*G02B 6/34* (2006.01)

(52) U.S. Cl. ..................... 385/37; 385/136; 385/137

(58) Field of Classification Search ................. 385/37, 385/12–13, 136, 137
See application file for complete search history.

(56) References Cited

U.S. PATENT DOCUMENTS

| | | | |
|---|---|---|---|
| 5,993,934 A * | 11/1999 | Reese et al. ................. | 428/113 |
| 6,044,189 A | 3/2000 | Miller | |
| 6,087,280 A | 7/2000 | Beall et al. | |
| 6,240,225 B1 | 5/2001 | Prohaska | |
| 6,366,721 B1 * | 4/2002 | Hu et al. ....................... | 385/37 |
| 6,374,015 B1 | 4/2002 | Lin | |
| 6,466,716 B1 * | 10/2002 | Ogle ............................. | 385/37 |
| 6,563,970 B1 * | 5/2003 | Bohnert et al. ............... | 385/13 |
| 2004/0218863 A1 * | 11/2004 | Skull et al. .................... | 385/37 |

OTHER PUBLICATIONS

G.W. Yoffe, Peter A. Krug, F. Ouellette and D.A. Thorncraft, "Temperature-Compensated Optical-Fiber Bragg Gratings", Optical Fiber Communications, vol. 8, 1995, OSA Technical Digest Series, pp. 134-135.

T. Iwashima, A. Inoue, M. Shigematsu, M. Nishimura and Y. Hattori, "Temperature Compensation Technique for Fibre Bragg Gratings Using Liquid Crystalline Polymer Tubes", Electronics Letters, Feb. 27, 1997, vol. 33, No. 5, pp. 417-419.

* cited by examiner

*Primary Examiner*—Sung Pak
(74) *Attorney, Agent, or Firm*—Volpe and Koenig, P.C.

(57) ABSTRACT

A device and a method of temperature compensating are disclosed. The device and method are employed for temperature compensation of a section of optical fiber. The device and method are useful for limiting any change in optical properties of the section of optical fiber or optical structures that can be corrected by changing the linear dimension accordingly. Such optical properties include the characteristic wavelengths of FBGs, Fabry-Perot cavities, and the like. The device includes a composite plate comprising plural fiber laminae, each of which has a designed orientation, and having a specific temperature-dependent characteristic in a direction for compensating an optical component positioned thereon having a temperature-dependent deformation, wherein said specific temperature-dependent characteristic is determined by said designed orientations of said plural fiber laminae.

26 Claims, 3 Drawing Sheets

DEVICE AND METHOD OF TEMPERATURE COMPENSATING OPTICAL COMPONENT

FIELD OF THE INVENTION

This invention relates generally to a temperature compensation of optical systems (including communications) and optical waveguides and more particularly to the temperature compensation of optical fibers and fiber Bragg gratings. With this compensation, the original temperature sensitive responses of the optical systems or components can then become relatively stable in the face of temperature changes.

BACKGROUND OF THE INVENTION

The development of in-fiber Bragg gratings (FBGs) has led to their use in wavelength measuring systems for sensor and telecommunication systems as well as for wavelength division multiplexing, dispersion compensation, laser stabilization and erbium gain flattening, all around 1550 nanometer wavelengths. These applications depend on FBG wavelength references which either do not change with temperature or change in a predictable manner.

The temperature coefficients of thermal response characteristics of FBGs are unacceptably high when the FBGs are used as wavelength reference or wavelength-selective passive component. Control of the thermal response characteristics not only enable FBGs to have low temperature coefficients, but also allow the temperature coefficients of FBGs to be tailored to match, or track, the temperature coefficients of other components used in an optical wavelength reference system. For example, the FBG can be used as a marker to identify a particular wavelength in the comb of wavelengths produced by a fiber Fabry Perot filter when the wavelengths of the comb drift with temperature.

Accurate wavelength referencing requires either temperature calibration or temperature compensation, or else temperature control, of the wavelength reference devices. In the latter case, additional sensing and control circuitry as well as thermoelectric heater/coolers requiring high electrical power consumption are generally needed. The resulting devices are usually not compact and robust nor maintenance-free for long-term applications. Temperature compensation or calibration is the more practical technique, with compensation being preferred since it provides an independent reference with a simpler and maintenance-free construction which requires no correction calculations circuitry.

Various methods have been devised for achieving temperature independence for the wavelengths of FBGs. These methods range from active systems that utilize feedback to monitor and dynamically control certain parameters, to passive devices that utilize the thermal characteristics of materials/structures to modify the response of the FBG wavelength to temperature. Passive devices are more desirable since they are much simpler and require no power source and so are generally maintenance-free. The wavelength of an FBG is determined by the refractive index of the fiber and the spacing of the grating, both of which change with temperature. Since the refractive index is not easily controlled, passive temperature compensation devices generally operate by controlling the elongation with temperature of the optical fiber containing the FBG This is usually accomplished by clamping the fiber containing the FBG onto a mechanical structure, which is designed to result in a compression of the fiber with increasing temperature.

G. W. Yoffe et al. proposed to use the differential thermal expansion of a silicon tube and an aluminum tube. The optical fiber was glued to the aluminum tube using epoxy. A nut on the threaded aluminum tube adjusts for fiber pretension. A wavelength shift of 0.7 pm/° C. was achieved, but the overall structure requires precision-made components and is complicated to assemble (G. W. Yoffe, P. A. Kurg, F. Ouellette, and D. A. Thorncraft, "Temperature-compensated optical fiber Bragg gratings," in *Optical Fiber Communications*, vol. 8 of 1995 OSA technical Digest Series (Optical Society of America, Wash., D.C., 1995) pp. 134–135). More complicated design based on similar principle to offer temperature compensation over a wider temperature range has been patented by Lin et al. (Lin et al., "Temperature-compensating device with tunable mechanism for optical fiber gratings," U.S. Pat. No. 6,374,015, 2002).

Miller et al. achieved temperature compensation by using the bi-material strip of quartz and stainless steel (Miller et al., "Temperature compensated fiber Bragg gratings," U.S. Pat. No. 6,044,189, 1997). Strip widths of the steel and quartz were varied to achieve the desired level of compensation. The device is much easier to manufacture than Yoffe et al. and Lin et al.'s. However, all the above device are fragile and heavy and may present serious sideway strain to the delicate fiber. T. Iwashima et al. made use of the differential expansion of epoxy filled liquid crystal polymer tube to achieve a temperature coefficient of 1.3 pm/° C. Although the temperature coefficient was inferior to that of Yoffe et al.'s, the overall structure is much simpler to make. Moreover, the latter structure is lighter and more robust than the former devices (T. Iwashima, A. Inoue, M. Shigematsu, M. Nishimura, and Y Hattori, "Temperature compensation technique for fiber Bragg gratings using liquid crystalline polymer tubes," *Electron. Lett.*, vol. 33, pp. 417–419, 1997).

Beall et al. of Corning Glass Work developed a ceramic that has a negative thermal expansion coefficient. The compensated wavelength shift achieved was 1.212 pm/° C. Very careful control of the formulation of materials is required to obtain the desired negative temperature coefficient of expansion and the ceramic is fragile (Beall et al., "Athermal optical device," U.S. Pat. No. 6,087,280, 2000).

In 2001, Prohaska et al. proposed to make use of the anisotropic nature of calcite. Such anisotropy will lead to a profile of thermal expansion coefficients along different orientations. Certain orientation can be found to provide the necessary thermal compensation to the wavelength shift of the FBGs. Accurate formulation of materials is required to obtain the desired coefficient profile and precise alignment of fiber along the chosen orientation is needed (Prohaska et al., "Temperature compensated fiber grating and method for compensating temperature variation in fiber grating," U.S. Pat. No. 6,240,225, 2001).

The passive methods described in the preceding paragraph have the disadvantages of being relatively bulky, heavy, complicated to manufacture, and fragile. Moreover, modification of the degree of thermal compensation can only be done by using complicated mechanisms, massive structure or re-formulation of component material and as a result is difficult and expensive. It is therefore an object of this invention to produce a light-weighted, small-sized, simple, robust and inexpensive device which can provide passive temperature compensation for FBGs and other optical systems. The degree of compensation can be easily and inexpensively designed beforehand.

SUMMARY OF THE INVENTION

In general, this invention relates to a device and method for temperature compensation of a section of optical fiber.

The device and method are useful for limiting any change in optical properties of the section of optical fiber or optical structures that can be corrected by changing the linear dimension accordingly. Such optical properties include the characteristic wavelengths of FBGs, Fabry-Perot cavities, and the like.

More specifically, the invention provides a device for limiting the change in the reflected and transmitted wavelengths of a fiber Bragg grating with a change in temperature. The structure of the device forces an elongation of the fiber containing the grating with decreasing temperature, or a shortening of the fiber with increasing temperature. The structure comprises a composite plate consisting of a number of continuous reinforcing fibers in three-dimensional array infiltrated with a polymeric resin that binds the fibers together. The fibers in the array have different spatial orientations. By assigning the number of fibers in each of the chosen orientations and assigning the suitable amount of fiber to resin ratio, a gradient of thermal characteristics will result through the plate thickness and in different directions on the plane of the plate. Given a thermal expansion/contraction characteristics, the required orientation and amounts of fibers and resin can be determined beforehand using the Mechanics of composite materials. Thus the desired thermal expansion/contraction characteristics required for thermal compensation of optical components can be easily achieved along a chosen direction on predetermined outer or inner surfaces of the resulting composite plate. Since a great number of fiber orientation combinations and fiber to resin volume ratios is possible, a great flexibility and versatility on the design of thermal compensation characteristics can be obtained.

The laying of the correct amount fibers in the designed orientations and position can be done by conventional polymeric composite techniques. These include, but are not limited to, weaving a fiber perform, filament winding, tape laying and pre-impregnated lamina stacking methods. According to these different techniques, the polymeric resin may be pre-impregnated, applied during winding or infiltrated into a perform inside a molding tool. Consolidation of the composite is commonly done at high temperature under pressure. On cooling down, the gradient of thermal expansion coefficient through the plate thickness may introduce a certain degree of initial curvature in the plate depending on the consolidation mould design. If the temperature of the composite plate increases, the initial curvature will tends to alleviate. A deformation gradient ranging from extension to compression will then develop across the thickness of the plate. By sticking the optical component/structure along the chosen direction on the outer surface or embedding it in the pre-determined inner surface, temperature caused wavelength and dimension changes can be nullified.

Devices and methods of this invention can easily provide FBGs with temperature coefficients of wavelength less than one picometer per degree Celsius (pm/° C.). The plate in a temperature compensated FBG device need only be slightly larger than the FBG itself. An even larger width of 0.5 to 1 mm can be used for ease of handling. The length of the plate needs to cover the FBGs length and is typically 15 to 30 mm. The thickness depends on the pattern of fiber array chosen, the fiber and resin materials used and the method available for producing and consolidating the plate. Thickness around 0.3 mm is easily achievable. With a small-scale laboratory size consolidation facility and using the easy to handle pre-impregnated laminae stacking route, laminates dimensions of 30 cm×30 cm or above can commonly be produced. This means hundreds of temperature compensation devices can be cut from a single consolidation run and the cost for mass production is minimal. No expensive precision machining is required.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

Figure 1:
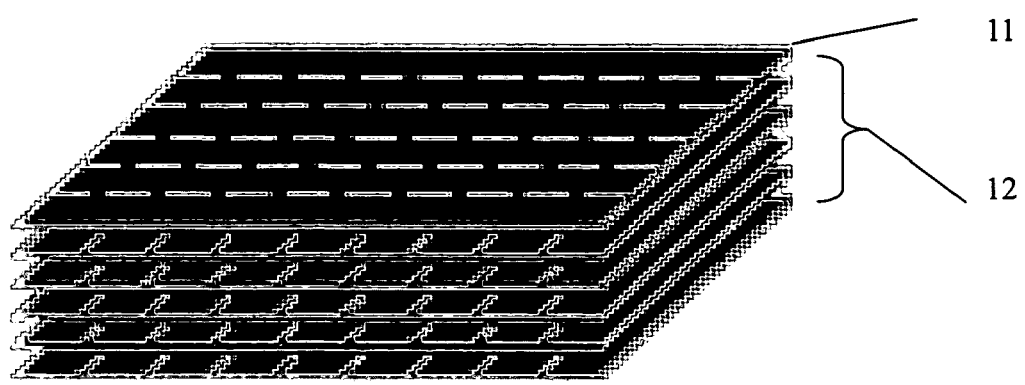
FIG. 1 is a blown-up drawing of a composite plate showing the three-dimensional array of fibers (broken lines) in different spatial orientations, bound by the resin (dark background)

In the drawings, like reference numerals indicate like features; and, a reference numeral appearing in more than one figure refers to the same element. The drawings and the following detailed descriptions show specific embodiments of the invention. In the preferred embodiment, the pre-impregnated fiber laminae stacking route was employed to manufacture the composite plate. Numerous specific details including materials, dimensions, and products are provided to illustrate the invention and to provide a more thorough understanding of the invention. However, it will be obvious to one skilled in the art that the present invention may be practiced using other composite fabrication routes and without these specific details.

Figure 2:
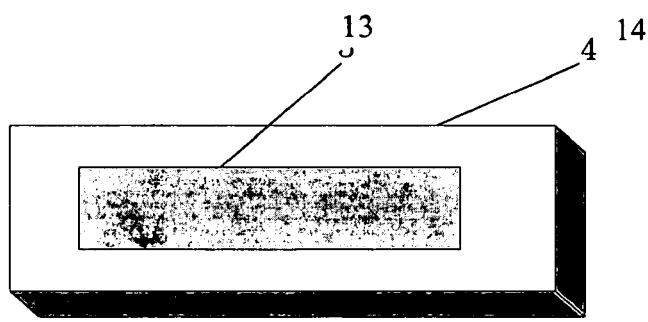
FIG. 2 is a schematic diagram of an exemplary set-up for a temperature compensated optical structure.

The composite plate 14 of the preferred embodiment shown in the perspective drawing of FIG. 1 employed one part of 0° carbon fiber reinforced epoxy lamina 11 and five part of 90° laminae 12. To make the composite plate 14, carbon fiber reinforced epoxy laminae is cut and stacked in the desired number of layers and orientations as indicated by 12. Conventional vacuum bag and autoclave technique was then employed to consolidate the composite plate 14. After consolidation and cooling, a composite plate with the 0° layer convex upward resulted. Plate of the required size is cut and the optical structure 13 is fixed on the composite plate 14 as shown in FIG. 2.

Figure 3:
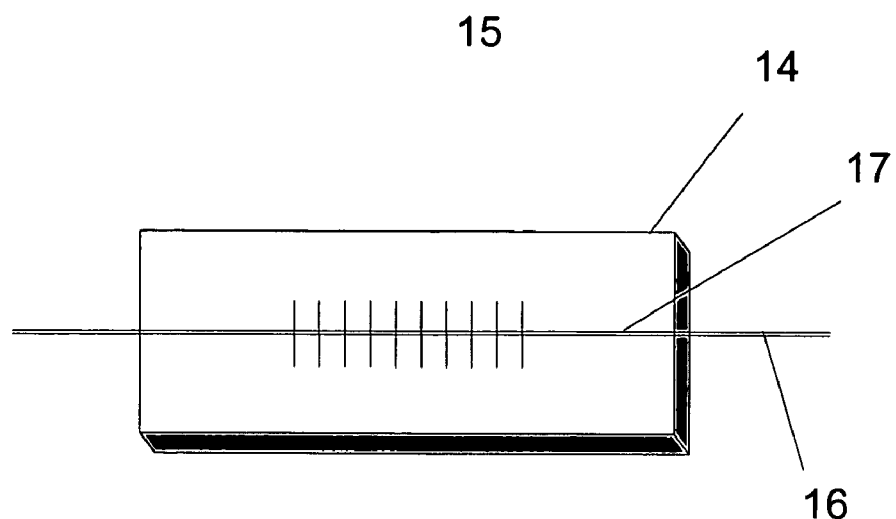
FIG. 3 is a schematic diagram of an exemplary set-up for a temperature compensated Fiber Bragg Gratings.
Figure 4:
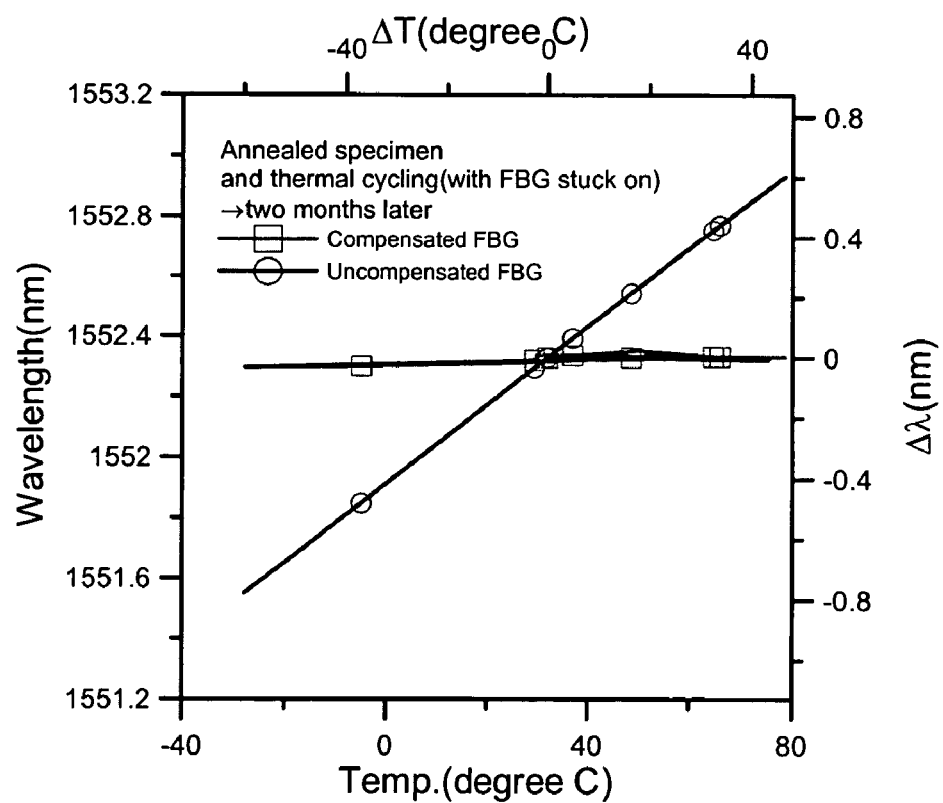
FIG. 4 is the typical results comparing the change in reflected wavelength of an uncompensated and a thermally compensated FBGs under different temperature.

FIG. 3 shows a preferred embodiment in which a composite plate 14, of dimensions 1 mm wide and 4 cm long, is cut and the optical fiber 16 with FBGs 15 is stuck on top of the 0° fibers along the 0° direction using glue 17. As temperature increases, the 0° fibers of the composite plate 14 contracts while the 90° fibers of the composite plate 14 with the resin extend, resolving the initial curvature of the plate and causing a compression on the optical fiber 16 with FBGs 15. This will decrease the period of the gratings and offset the drift of the reflected and transmitted wavelengths. Typical comparison of the change in reflected wavelength of an uncompensated and a thermally compensated FBGs under different temperature is shown in FIG. 4. The typical temperature coefficient of reflected wavelength for an FBG is about 10 pm/° C. Experimental results using the set-up shown in FIG. 3, where the composite plate 14 was 1 mm wide, 4 cm long and 0.9 mm thick, yielded a maximum wavelength shift of 0.79 pm/° C. If the composite plate 14 was stress relieved at 120° C. for 24 hours prior to FBGs fixing and the whole set-up was thermal cycled from 30° C. to 75° C. for three times first, a compensated wavelength drift of 0.24 pm/° C. was achieved.

Figure 5:
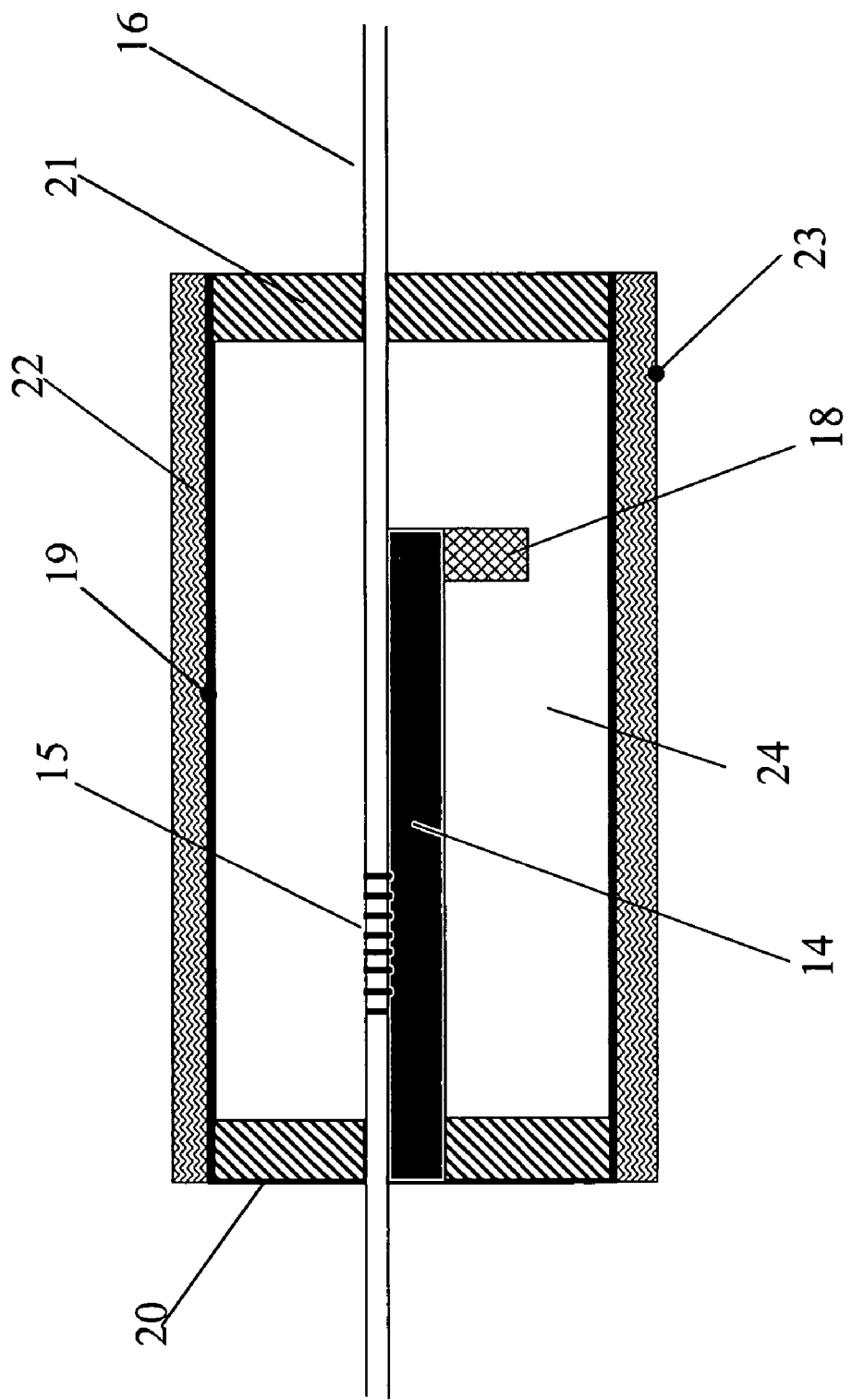
FIG. 5 is a schematic diagram of another embodiment of the temperature compensated FBGs.

Due to the small size and light-weightedness of the temperature compensation device, it is possible to stabilize the optical characteristics further by putting the whole structure into a small temperature isolating compartment. FIG. 5 reveals such an embodiment. Besides sticking the optical fiber 16 with FBGs 15 on the composite plate 14, one side of the composite plate 14 is fixed in a tube 22 using sealing plastic 20. The other end of the composite plate 14 is a cantilever free end. A weight 18 is fixed to the free end of the composite plate 14 to pre-tune the characteristic wavelength of the optical fiber 16 with FBGs 15 to a desired value. A vacuum is created in tube 22 before its other end is sealed up with plastic sealing 21. Both the tube 22 and plastic sealings 20 and 21 are made from low thermal conductivity and low thermal diffusivity materials. The inner surface 19 and outer surface 23 of the tube 22 are coated with aluminum which has a low emissivity. In this way, the FBGs 16 is largely shielded from environmental temperature changes as heat flow in the forms of radiation, convection and conduction is minimized as far as possible. This, together with the temperature compensation properties of the composite plate, will allow the characteristic wavelength of the FBGs to remain in an ultra-stable manner.

While the invention has been described above with respect to specific embodiments, it will be understood by those of ordinary skill in the art that various changes in form and details may be made therein without departing from the spirit and scope of the invention. For example, the invention has been illustrated for the temperature compensation of an FBG, but other optical structures within optical fibers can be temperature compensated using the devices and methods described herein. Moreover, although carbon fiber reinforced epoxy and specific fabrication technique is used in the exemplary embodiments, other fiber reinforced resin composite and fabrication methods can be employed instead. Moreover, pre-tuning of the FBGs wavelength may use an adjustable spring instead of the dead weight 18 so that later change in tuning is possible. Those of ordinary skill in the art will appreciate that there are functional equivalents of the components in the illustrated configurations that can be readily substituted therein or for which ready adaptation is possible. All such variations and functional equivalents are encompassed in this invention.

What is claimed is:

1. A device for temperature compensation, comprising:
a composite plate comprising plural fiber reinforced laminae, each of which has a designed fiber orientation, and having a specific temperature-dependent characteristic in a direction, for compensating an optical component positioned thereon and having a temperature-dependent deformation,
wherein said specific temperature-dependent characteristic is determined by said designed fiber orientation of said plural fiber laminae, and said composite plate has one end fixed in a compartment and the other end being a cantilever free end, and said compartment is sealed to isolate the influence of external temperature fluctuations.

2. A device as in claim 1 wherein said optical component includes fiber Bragg gratings.

3. A device as in claim 1 wherein said optical component includes a waveguide.

4. A device as in claim 3 wherein said optical component includes fiber Bragg gratings.

5. A device as in claim 1 wherein said specific temperature-dependent characteristic has a designable coefficient of thermal expansion in said direction.

6. A device as in claim 1 wherein each of said plural fiber laminae is made of reinforcing continuous fibers.

7. A device as in claim 6 wherein said composite plate is manufactured by consolidating a designed three dimensional array of said reinforcing continuous fibers and a matrix.

8. A device as in claim 7 wherein said matrix is a polymeric resin for binding said reinforcing continuous fibers together.

9. A device of claim 1 wherein a vacuum is created inside said compartment to alleviate heat conduction to said optical component under temperature compensation by convection and conduction.

10. A device of claim 1 wherein the said compartment is coated all around by a low thermal conducting material to alleviate heat conduction into said compartment.

11. A device as in claim 1 wherein an internal surface of said compartment is plated with a material having a low emissivity and a high reflectivity to alleviate heat conduction to said optical component under temperature compensation by radiation.

12. A device as in claim 1 wherein an external surface of said compartment is plated with a material having a low emissivity and a high reflectivity to alleviate heat conduction to said optical component under temperature compensation by radiation.

13. A device as in claim 1 wherein a dead weight or adjustable mechanism is attached to said composite plate to allow pre-tuning of optical characteristics of said optical component without scarifying a temperature compensation capability of said composite plate.

14. A method for temperature compensation, comprising steps of:
providing a composite plate comprising plural fiber laminae, each of which has a designed fiber orientation, and having a specific temperature-dependent characteristic in a direction;
bonding an optical component having a temperature-dependent deformation along said direction on said composite plate so as to compensate said deformation through said specific temperature-dependent characteristic; and
fixing said composite plate in a compartment at one end thereof,
wherein the other end of said composite plate is a cantilever free end, said specific temperature-dependent characteristic is determined by said designed fiber orientations of said fiber laminae, and said compartment is sealed to isolate the influence of external temperature fluctuations.

15. A method as in claim 14 wherein said optical component includes fiber Bragg gratings.

16. A method as in claim 14 wherein said optical component includes a waveguide.

17. A method as in claim 16 wherein said optical component includes fiber Bragg gratings.

18. A method as in claim 14 wherein said composite plate provides a contraction during temperature rise and an expansion during temperature drop.

19. A method as in claim 14 wherein said composite plate is fabricated by steps of:
   providing said plural fiber laminae;
   cutting said fiber laminae into specific size and shape;
   stacking said fiber laminae with a designed sequence of said fiber orientations;
   consolidating said stacked fiber laminae under appropriate temperature and pressure in a suitable mold into said composite plate; and
   cutting said consolidated composite plate into a required size.

20. A method as in claim 19 wherein each of said fiber laminae is a prepreg of resin pre-impregnated fiber lamina.

21. A method as in claim 14 wherein said composite plate is consolidated by different molds tooling into a plate having one of a flat and a curved shape.

22. A method of claim 14 wherein a vacuum is created inside said compartment to alleviate heat conduction to said optical component under temperature compensation by convection and conduction.

23. A device method of claim 14 wherein the said compartment is coated all around by a low thermal conducting material to alleviate heat conduction into said compartment.

24. A method as in claim 14 wherein an internal surface of said compartment is plated with a material having a low emissivity and a high reflectivity to alleviate heat throughput to said optical component under temperature compensation by radiation.

25. A method as in claim 14 wherein an external surface of said compartment is plated with a material having a low emissivity and a high reflectivity to alleviate heat throughput to said optical component under temperature compensation by radiation.

26. A method as in claim 14 wherein a dead weight or adjustable mechanism is attached to said composite plate to allow pre-tuning of optical characteristics of said optical component without scarifying a temperature compensation capability of said composite plate.

* * * * *